United States Patent
Kirkpatrick et al.

(10) Patent No.: US 7,174,459 B2
(45) Date of Patent: Feb. 6, 2007

(54) IMPRINTING AN IDENTIFICATION CERTIFICATE

(75) Inventors: Scott Kirkpatrick, Jerusalem (IL); Daphna Weinshall, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 10/759,091

(22) Filed: Jan. 20, 2004

(65) Prior Publication Data

US 2005/0005119 A1 Jan. 6, 2005

Related U.S. Application Data

(60) Provisional application No. 60/483,909, filed on Jul. 2, 2003.

(51) Int. Cl.
*H04L 9/00* (2006.01)

(52) U.S. Cl. .................. 713/168; 713/170; 726/27; 726/28; 726/30

(58) Field of Classification Search ............ 713/176, 713/155–156, 161, 168, 173, 175, 181, 200–202, 713/170; 380/200, 258, 54–55; 235/382.5, 235/382; 340/825.34, 825.3, 825.31, 5.5; 726/27–30, 16–17, 21

See application file for complete search history.

(56) References Cited

U.S. PATENT DOCUMENTS

| | | | | |
|---|---|---|---|---|
| 5,559,961 A | * | 9/1996 | Blonder | ............ 713/202 |
| 5,719,560 A | * | 2/1998 | Watkins | ............ 340/5.5 |
| 5,764,770 A | * | 6/1998 | Schipper et al. | ............ 713/176 |
| 5,991,409 A | | 11/1999 | Windel et al. | |
| 6,565,000 B2 | | 5/2003 | Sehr et al. | |

FOREIGN PATENT DOCUMENTS

WO   WO 2005/004366   1/2005

OTHER PUBLICATIONS

Reber "Implicit Learning of Artificial Grammars", Journal of Verbal Learning and Verbal Behavior, 6:855-863, 1967.
Perruchet et al. "Synthetic Grammer Learning: Implicit Rule Abstraction of Explicit Fragmentary Knowledge?", Journal of Experimental Psychology: General, 119(3): 264-275, 1990.
Tulving et al. "Priming Effects in Word-Fragment Completion Are Independent of Recognition Memory", Journal of Experimental Psychology: Learning, Memory & Cognition, 8(4): 336-342, 1982.
Backer Cave "Very Long-Lasting Priming in Picture Naming", Psychological Science, 8(4): 322-325, 1997.
Musen et al. "Implicit and Explicit Memory for Visual Patterns", Journal of Experimental Psychology, Learning, Memory and Cognition, 16(1): 127-137, 1990.
Resink et al. "To See or Not to See: The Need for Attention to Perceive Changes in Scenes", Psychological Science, 8(5): 368-373, 1997.

(Continued)

*Primary Examiner*—Hosuk Song

(57) ABSTRACT

A system and method for using imprinting as part of a security function that involves a user, for a security and/or identification mechanism. Imprinting is preferably used for cryptographic primitives, for determining a one-way function that operates at least partially according to a characteristic and/or function of the human brain.

16 Claims, 9 Drawing Sheets

OTHER PUBLICATIONS

Long et al. "To Reverse or Not to Reverse: When Is An Ambigous Figure Not Ambigous?", American Journal of Psychology, 112(I):41-71, 1999.

Shepard "Recognition Memory for Words, Sentences, and Pictures", Journal of Verbal Learning and Verbal Behavior, 6: 156-163, 1967.

Standing et al. "Perception and Memory for Pictures: Single-Trial Learning of 2500 Visual Stimuli", Psychonomic Science, 19(2): 73-74, 1970.

Karni et al. "The Time Course of Learning A Visual Skill", Nature, 365:250-252, 1993.

Dhamija et al. "Déjà Vu: A User Study Using Images for Authentication", Proceedings of the 9th Usenix Security Symposium, 14 P., 2000.

Hopper et al. "A Secure Human-Computer Authentication Scheme", Preprint CMU-CS-00-139, p. 1-6, 2000.

Matsumoto "Human-Computer Cryptography: An Attempt", ACM Conference on Computer and Communications Security, p. 68-75, 1996.

Matsumoto "Human Identification Through Insecure Channel", Theory and Application of Cryptographic Techniques, p. 409-421, 1991.

Ross "Is It Just My Imagination?", Microsoft Research News & Highlights, http://research.microsoft.com/displayArticle.aspx?id=417.

Password "@stake LC 5", The Password Auditing & Recovery Application, http://www.atstake.com/research/lc.

* cited by examiner

Prior Art

IMPRINTING AN IDENTIFICATION CERTIFICATE

This application claims priority from U.S. Provisional Application No. 60/483,909, filed Jul. 2, 2003, hereby incorporated by reference as if fully set forth herein.

FIELD OF THE INVENTION

The present invention relates to the use of human memory as a security and/or identification mechanism, and in particular, the use of imprinting for such a mechanism.

BACKGROUND OF THE INVENTION

Security is increasingly important, such that security and/or identification mechanisms are also very important. Such mechanisms are vulnerable to attack through stealing passwords or codes. One attempt to overcome such vulnerabilities is to use an aspect of the human individual which cannot easily be copied, such as fingerprints or retinal "prints". However, these biometric characteristics may still be copied or forged.

The protocol used to verify a password is quite simple, and usually involves comparing an encrypted version of the password with a stored encrypted copy. The weakness is the difficulty of remembering all the passwords and PINs that modem life requires without writing them all down (unencrypted) and posting them in an obvious place or using easily-guessed personal information. As a result, the apparent security of a password can be illusory. Programs such as L0phtCrack and its commercial derivative, L4 (Password), have shown that many passwords can be guessed by attacks which try long lists of common words, enhanced by random extensions.

The common PIN or password is easy to describe to others. One can easily be impersonated by someone who knows the password, such that it is not very safe from eavesdroppers. Users must also make considerable effort to remember all of the passwords being used. However, the protocol used to verify a password is quite simple. Therefore, solutions to the above problems should also be easy to use, but also safer from impersonation. Verification should also be easy.

Some attempts to overcome these problems have involved maintaining at least some information in the mind of a user. This information may then be used for security and/or identification, optionally through some type of mental function or effort (other than memory alone).

Previous efforts to create better schemes for identifying human individuals to computers have focused on defeating the efforts of an observer or wire-tapping eavesdropper by requiring the human individual to perform mathematical calculations involving a shared secret. Matsumoto's 1991 and 1996 papers, for example, require the user to perform the XOR of a supplied bit string with a memorized bit string, and report the parity of the result to the computer, and/or other calculations. While this may be within the mental arithmetic capabilities of some programmers, it seems too complex for general use. The method requires the use of a shared secret password, in this case a secret bit string, of which the user is completely aware. Hopper and Blum (2000) explore more complicated protocols which, they argue, reduce the complexity of the computation that the human individual must perform.

The literature of psychophysics and cognitive psychology has many studies of "imprinting" phenomena, simple behaviors or recognitions which are quickly learned, and can be retrieved much later with little effort. Obviously the "imprint" cannot be captured by external inspection. Many "imprinted" processes are stored with little conscious awareness of what was learned, so that an individual cannot tell another person about the contents of such an imprint. One example of low awareness "imprinting" involves viewing pictures. A very large database of images could be used, from which certain image(s) could be selected for viewing. If an individual were to view a previously shown image, grouped with another image that had not been previously shown, the individual could select the previously seen image with high confidence, even long after the initial training.

One use of imprinting is found in the work of Dhamija and Perrig (2000), who have the user select a small group, their portfolio, of images from a larger set of images. Recognition of these images certifies the user. The taught protocols emphasize making the user aware of the selected images, and using the same images repeatedly for identification. The motivation was to achieve more natural human factors, "pictures replacing passwords," at a modest security level. However; repetitive use of pictures could easily lead to similar problems as for regular passwords, namely that an eavesdropper could steal such a "picture password".

A scheme recently described by researchers at Microsoft (Microsoft) uses cued recognition of artificially generated Rorschach patterns to generate passwords which would be too long to remember and impossible to guess. The user is shown a set of pictures and asked to assign a word to each, keeping it secret. Letters selected from these words become the password for subsequent certification. The pictures provide cues to recall the chosen words, and thus the passwords. Again it appears that the evaluation that is done is of the password cued by the pictures, and does not involve a probabilistic assessment of error. Furthermore, it is still possible to steal the images, which are used repetitively, and/or to otherwise attack the password itself.

SUMMARY OF THE INVENTION

The background art does not teach or suggest the use of imprinting as part of a security function that is performed with the human user and that is required for a security and/or identification mechanism. The background art also does not teach or suggest the use of imprinting as a cryptographic primitive.

The present invention overcomes these disadvantages of the background art by providing a wide range of human memory imprinting phenomena as potential cryptographic primitives. These "imprinting" phenomena are characterized by vast capacity for complex experiences, which can be recognized without apparent effort and yet cannot be recalled directly. Thus they become natural "one-way functions" suitable for use in near zero-knowledge protocols, which minimize the amount of secret information exposed to prying eyes while certifying an individual's identity. It should be noted that this use of imprinting is not intended as a simple "picture password", but rather uses imprinting as part of a security function that is performed with the human user.

The term "imprinting" is used herein to describe the range of memory phenomena in which the information stored greatly exceeds the amount which is easily recalled by a person, and in which the information is stored with little or no perceived effort. In the psychology literature, these phenomena are broken down into two, three or more categories, and the boundaries are not always clear. For example, there are studies of implicit learning, procedural learning, or "priming." The process of the present invention is an example considered to be implicit learning. Learning to ride a bicycle is the classic example of procedural learning, although there are things other than motor skills which are learned by the procedure of doing them multiple times. Priming usually describes phenomena of which the individual is completely unaware. Imprinting may optionally include one or more of these categories, but is more preferably directed toward implicit learning.

Cryptographic primitives may be considered to function as follows. For the present invention, human memory is considered to loosely resemble a one-way function. One certainly cannot run it backwards to extract what has been stored for purposes of telling another person what that is. A one way function is a transformation which is easy to carry out but cannot be reversed without expending an unrealistically large computational effort. Thus even if an adversary has the encrypted message and the key used to encrypt, and knows the function used to encrypt, it is not possible to determine the original message.

The present invention also preferably uses a plurality of pictures or other items capable of being sensed for imprinting. More preferably, as described in greater detail below, each picture (or other imprint) is used only once, as for the one-time pad. The one-time pad is a type of encryption in which an encryption scheme depends on a sequence of random numbers, each number used to encrypt one symbol and then discarded, never to be used again. No method of guessing frequently-used patterns in the message may be used when the code is being discarded as fast as it is used.

The present invention also preferably structures the protocol to expose the fewest possible portions of the imprint in each session, using the same ideas as near-zero knowledge exploits, namely the probabilistic assessment of the likelihood that this is not an authorized user, but an imposter, stopping when this probability drops below some prearranged threshold. Zero-knowledge or near-zero knowledge protocols are not usually used to encrypt whole messages, but to certify some fact without actually revealing its details. For example, a zero-knowledge proof may be conducted between two parties in a series of rounds. Party A wishes to prove some fact to the satisfaction of Party B by answering the questions of Party B, which Party A could only answer if the fact is true. Party B accumulates enough evidence about the truth of the fact of Party A in several rounds to convince Party B that Party A is telling the truth. Party B does not obtain the details of the secret fact in this way, and neither does any eavesdropper. These functions or characteristics of the human brain include the following. Human memory has the capacity to quickly learn vast amounts of information (pictures and strings). This capacity allows the use of cryptographic zero-knowledge-like authentication protocols, which minimize the exposure of the shared information upon which the certifying transaction is based. Such protocols rely on the probabilistic evaluation of acceptance error (the likelihood of false identification), and are safe from eavesdroppers, since only a few bits of information are securely transmitted, and those bits are used only once.

Also, the stored information is hard for people to recall but easy to reveal by less direct means long after the initial presentation. One example is recognition: users are asked to recognize an example of the material as one to which they have previously been exposed, rather than to recall an object (a "shared secret") unassisted from memory. The authentication protocols of the present invention preferably access human memory without the need for recall, which makes the protocols more pleasant to use and safer from imposters: the knowledge required for authentication cannot be passed from one person to another.

The validation of imprinted certificates is inherently a probabilistic process, since it involves human performance. The present invention also includes methods for certifying a user, analyzing in each case the protocol required to reduce the chance of imposture by guessing or eavesdropping to some desired small probability. The present invention may optionally include tasks related to any cognitive-sensory function, including but not limited to, verbal tasks, visual tasks, olfactory (smell-related) tasks, audio tasks, taste tasks or touch-related tasks. Optionally users may be allowed to select a particular sensory protocol, for example depending on whether their memory is more suited for sounds, words, images etc. All the phenomena are described in the relevant literature of perception and cognitive psychology, where the basic effects are not controversial (although the underlying mechanisms may be (6)). However, the authentication protocols are new and inventive, since certification is a new application that was not discussed in the art.

According to the present invention, there is provided a method for providing a security function with a user, comprising: imprinting the user with at least one cryptographic primitive determined from a sensory mechanism; and at least one of authorizing, identifying or authenticating the user according to an ability to recall the at least one cryptographic primitive.

Preferably, the imprinting comprises implicit learning by the user. More preferably, the at least one cryptographic primitive is used to encrypt a message according to a one-way function. Also more preferably, a one-time pad comprises the at least one cryptographic primitive. Also more preferably, a near-zero knowledge function comprises the at least one cryptographic primitive.

More preferably, the sensory mechanism comprises vision, such that the at least one cryptographic primitive comprises recognizing an image. Most preferably, the recognizing the image comprises: training the user on a plurality of trained images; and testing the user on a combination of a trained image with at least one distractor image. Also most preferably, the at least one distractor image comprises a plurality of distractor images.

Preferably, the testing comprises: selecting a plurality of different trained images by the user in sequence, the sequence providing the cryptographic primitive for determining the at least one of authorizing, identifying or authenticating the user.

According to another embodiment of the present invention, there is provided a method for authenticating, authorizing or identifying a user, comprising: training the user with information through a sensory mechanism; and determining accurate recall of the information to authenticate, authorize or identify the user.

According to yet another embodiment of the present invention, there is provided a method for a one-way function for authenticating, authorizing or identifying a user, comprising: imprinting the user with a cryptographic primitive; and testing the imprinting with at least a similar or identical cryptographic primitive to authenticate, authorize or identify the user.

Preferably, the cryptographic primitive is derived from input according to a sensory mechanism. More preferably, the input comprises at least one image and the sensory mechanism is visual.

Also more preferably, the input comprises at least one pseudoword and the sensory mechanism is verbal.

Preferably, the sensory mechanism is selected from the group consisting of tactile, olfactory, audible and taste.

Also preferably, the testing comprises determining whether the user is capable of discriminating between an imprinted cryptographic primitive and a non-imprinted cryptographic primitive.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE PREFERRED EMBODIMENTS

Figure 1:
FIG. 1 shows an exemplary dual perception image.

The present invention is of a system and method for using imprinting as part of a security function that involves a user, for a security and/or identification mechanism. Imprinting is preferably used for cryptographic primitives, for determining a one-way function that operates at least partially according to a characteristic and/or function of the human brain.

The present invention has a number of advantages over the background art. For example, recognized images from a small set of pictures have high user awareness, yet are difficult to describe to another person. As a result it is difficult for another person to impersonate the user by correctly identifying images. Nonetheless, eavesdropping will succeed if the same image (or few images) is always used as a certificate or password. The effort to remember an image is less than the effort to remember passwords, and the verification protocol is more complex, but not much so. The present invention further increases the security of using images for the security function by not using a particular image as a password. Instead, preferably information is learned automatically in a process known as "priming", for which examples are described below. The information is stored in a procedural memory of the user. The user is unaware of the ability to identify the imprinted information, and cannot describe it to another. Therefore the likelihood of successful impersonation is extremely low, and eavesdropping is not a danger. No effort is required to retain the "primed" ability, but the measurement of these effects may be subtle, and require the most complex protocols.

The present invention relies upon particular cognitive functions or characteristics of the present invention, such as the distinctions between explicit and implicit memory, and recall (free and cued) vs. Recognition. These distinctions are not always fully understood, but enough is known that can be used for the design of many types of certificates (information for security functions), with different properties that may be appropriate for different applications.

Procedural memory covers a range of distinct memory abilities which rely on information that cannot be verbalized. During the acquisition of procedural memory, what is learned cannot be described. Typical examples are motor skills (such as riding a bicycle) and perceptual learning, but the acquisition of grammar is usually also considered to be a process of procedural memory. A related concept is that of implicit memory, where memory of past experience is retained without specific recognition of an invoked memory of past events. Manifestations of implicit memory are typically called priming, and they can come in different modalities, including image priming and string repetition priming.

A common characteristic of both procedural memory and implicit memory is that recognition of an invoked memory is relatively effortless, requiring no or little conscious effort. Such memories can be retained effortlessly for a very long time, and be invoked with little preparation when the need arises. Moreover, since these memories cannot be verbalized or easily described, they cannot be easily revealed to other people, whether willingly or unwillingly. All of these characteristics are very useful properties for a verification certificate, which provides information for a security function. On the negative side, it may take time to acquire procedural skills or become primed by implicit memories, and the verification may also require a relatively laborious protocol.

These characteristics of human memory are heavily used for advertising. It is commonly assumed that mere exposure to names and labels increases people's willingness to buy "familiar" products in the future. In a more controlled environment, it has been shown that objects previously exposed in advertisements are judged as 'more attractive' by people, even if the advertisements were not carefully watched during the time of exposure.

As an example for the use of procedural memory for "imprinting", the paradigm of artificial grammar learning can be considered, initiated by Reber (Reber 1967). In this paradigm people are asked to memorize a list of words generated by a finite-state automation. After the initial training period, the subjects are told that the words were generated by a certain grammar, and are asked to recognize new words as "grammatical" or not. Subjects perform better statistically than chance "guessing" on this task, and better than control subjects who have not observed the "grammatical" strings before. When asked to describe how they perform such discrimination and identification, subjects are not able to describe what they have learned and what rules they are using to do the task. For this reason this task is considered by some to involve implicit memory.

As an example of priming, the paradigm of ambiguous figures can be used. For ambiguous pictures, two percepts are possible but not simultaneously, such as the famous picture shown in FIG. 1, which may perceived as showing a young girl or an old woman. Previous exposure to the stimulus which favored one of the possible perceptions of the picture "primes" people to prefer that same perception in later exposures (Long and Olszweski, 1999).

Figure 2:
FIG. 2 shows an exemplary closure image.

Another possible example involves 'closure pictures', somewhat similar to the famous "Dalmatian dogs" picture shown in FIG. 2. With previous exposure to such pictures shown with increasing level of details, recognition in a second exposure can be done from a "sparse" picture. In such a picture, only a few details (for example, only fraction of the edges) are presented. Untrained subjects cannot recognize such pictures. Thus subjects are primed to recognize pictures of objects they had seen before from very few details, but are not able to do the same with new objects.

Additional examples for identity/repetition priming include but are not limited to, a fragment completion task: Tulving et al (1982) asked participants to learn long, infrequently used words e.g. TOBOGGAN. Either 1 hour or 1 week later participants are asked to fill in spaces on a page in a fragment completion task (_O_O_GA_). Participants exhibited repetition priming, such that performance was better on words seen previously. This is a very long-lasting effect, and lasts up to months.

Another example is picture naming: (Cave 1997) reported faster naming of pictures repeated from a prior exposure than new pictures; this effect lasts up to a year or more. Musen & Treisman (1988) showed that a single exposure of a novel, nonverbal stimulus supports long-lasting perceptual priming, while recognition memory rapidly deteriorates.

Perceptual learning is another example, as many low level visual skills (such as texture discrimination or even contrast detection) can be improved with practice; improvement tends to be very specific, which is useful for the purpose of priming a certificate, and can last a long time (e.g., 2 years in texture learning, see (Karni and Sagi, 1993)).

Explicit memories also come with different degrees of awareness. Some memories are easy to recall freely (such as an individual's name and address), but most explicit memories require some assistance for recall. Pictures, for example, are relatively difficult to recall but easy to recognize. Regardless of the memory modality, it is almost always easier for people to recognize items in memory (for example, indicate whether a selected item is familiar or not) rather than freely recall items from memory. In between recall and recognition, there is the "cued recall" paradigm, where groups of items (such as words) are associated with each other, so that when encountered with one item, a person can easily retrieve the second or more items. This characteristic of human memory is commonly used in the teaching of languages, and possibly other skills.

One important characteristic for the design of certificates is that explicit memories are relatively easy to acquire. As long as the recognition or cued recall paradigms are used, it is still often the case that the memory traces are hard to verbalize or otherwise be given away to other people. Also, if the modality, selected from a sensory function, is suitable for such memories, such as images being used for the visual sensory function, only a little effort is required to maintain a very large store of items; these items can then be used for verification on a one-time basis, and the verification protocol can therefore be safe from eavesdroppers.

One non-limiting example of a low-awareness recognition process is the use of a large database of images for establishing visual imprinting with a user. It has been shown that people can remember a very large number of pictures following a single short exposure to each picture. For the present invention, optionally multiple short exposures are used to consolidate the memories. Visual memory (memory for pictures) is potentially very long term, lasting up to years (Sheppard, 1967) and the capacity appears limitless (Standing et al, 1970). As an example of cued-recall in another modality, the paired associate paradigm may optionally be used, in which users are asked to provide a matched group word/figure to a given cue word/figure.

Another non-limiting example involves an effect known as 'change blindness'; recently a number of studies have shown that under certain circumstances, very large changes can be made in a picture without observers noticing them. In these experiments changes are arranged to occur simultaneously with some kind of extraneous, brief disruption in visual continuity, such as the large retinal disturbance produced by an eye saccade, a shift of the picture, or a brief flicker, e.g. Rensink et al (1997). However, once a subject becomes aware of the change, it is rapidly perceived in subsequent viewings.

Preferably, training for the present invention is performed in at least one session but more preferably in more than one session; if a plurality of sessions is used, they are preferably performed on successive days. Depending upon the complexity of the material on which the subject is to be trained, the training session may range in length from a few minutes to a few hours, but preferably is of relatively short duration (such as up to about one half hour for example). A sufficient large set of objects on which imprinting is to occur, such as pictures for example, is preferably used; for example, for pictures, a set of pictures ranging in size from about 10 to about 500 pictures was used; a medium size set (for example around 100 pictures) was found to be preferable. The database of pictures or other objects may optionally be of any size, but is preferably from hundreds to thousands or even millions of objects.

The training session is optionally and preferably ended with a short practice test session. More preferably, a test session is performed shortly after completing the training session but with a break of from a few minutes to a few days. Refresher training may optionally be performed as needed, depending upon the number of objects in the original training session and the rate of use.

For an actual test session, preferably a plurality of distractors is used, since it was found to decrease the chance of someone from guessing the correct object (picture etc) without appreciably decreasing the chance of trained individual to identify the correct object (data not shown).

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings described in the Examples section. The invention is capable of other embodiments or of being practiced or carried out in various ways. Also, it is to be understood that the phraseology and terminology employed herein is for the purpose of description and should not be regarded as limiting.

EXAMPLE 1

Visual Perception as the Sensory Mechanism

This Example describes an illustrative method for certificates based on visual recognition, by using a very large database of images for training, followed by recognition of at least one image. Recognition of images forms the cryptographic primitive, with visual perception and recognition as the sensory mechanism for the method of the present invention. Preferably recognition is performed in the form of discrimination, such that the user is able to select a correct image from a plurality of images. The correct image may optionally have been shown previously, or alternatively may be similar to a previously displayed image during the training process.

Figure 3:
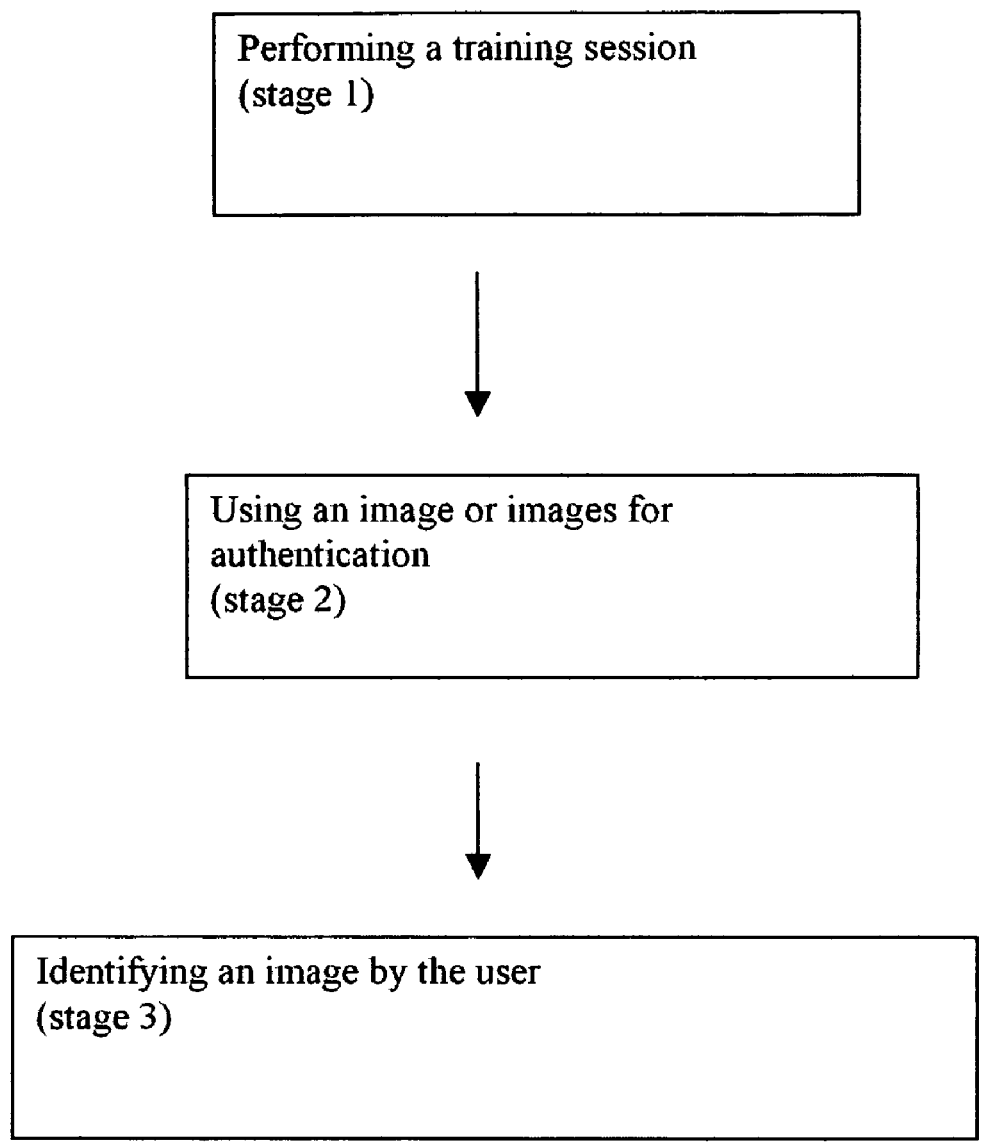
FIG. 3 shows a flowchart for an exemplary method according to the present invention.

The exemplary method of the present invention, shown in FIG. 3, preferably starts with a training session in stage 1, during which the user is shown a relatively large set of images, preferably randomly selected from a very large database, preferably at least about 100,000 images, although there is no upper limit. Image databases with 1 million or more pictures exist already, and larger ones are coming into use as digital photography becomes more prevalent. An important, limiting practical issue is therefore the ability to select groups of pictures for this use that are easily remembered, have a common central figure or story, and are not so similar as to be confusing, rather than the database size. This process may even be performed manually, as was done for this Example, with some simple tools to record the choices of images. It was found to be possible to construct 500–1000 groups from a much larger database, and then select randomly the one picture in each group which a particular user would be trained on, reserving the rest of each group for use as distractors.

In stage 2, after the training process has finished, the memory of the images may optionally be used for authentication. During authentication, the user is shown a small set of preferably randomly selected images (preferably from about 2 to about 9 images) side by side, only one of which was present in the original training set. In stage 3, the user identifies the image shown during the training session, and/or the most similar image to one displayed during the training session. This stage may optionally and preferably be repeated more than once, to defeat random guessing. To defeat eavesdropping, each image in the training set is optionally and more preferably used only once for certification (security and/or identification and/or authentication) purposes. Thus retraining is preferably performed when the trained set of images is exhausted.

To analyze the effectiveness of picture recognition as a certificate, for performing the above security function, the behavior of an imposter who has not been trained on the same specific images is considered. Let n denote the number of images shown side by side in each trial. The imposter would guess correctly $1/n$ of the time. The performance of the user might also not be perfect, but can be distinguished from guessing on a statistical basis after a few presentations. A certification application can optionally operate by presenting images for recognition and stopping as soon as the chance that guessing would have produced the observed number of correct recognitions is reduced below a preset threshold.

Figure 5A:
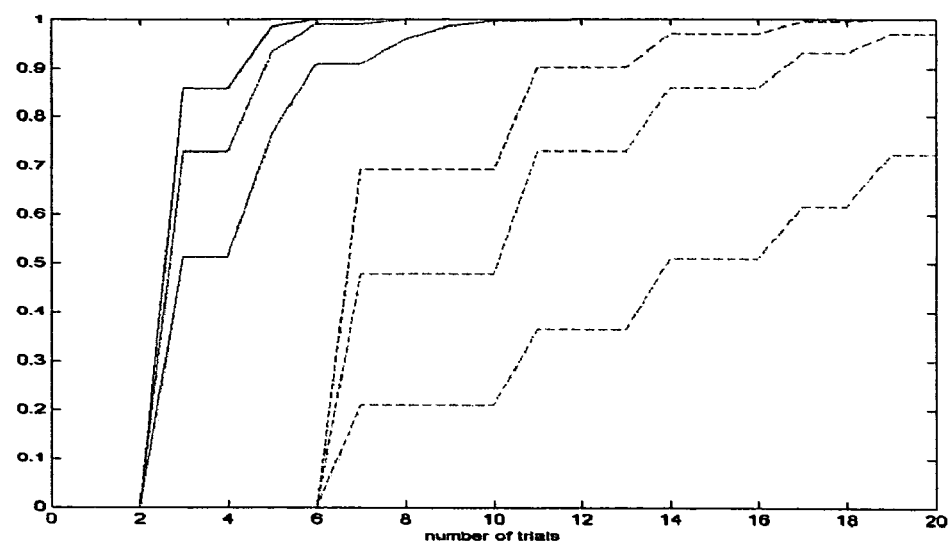
FIGS. 5A and 5B show graphs which compare the behavior of three model users according to different simulations of the method according to the present invention.
Figure 5B:
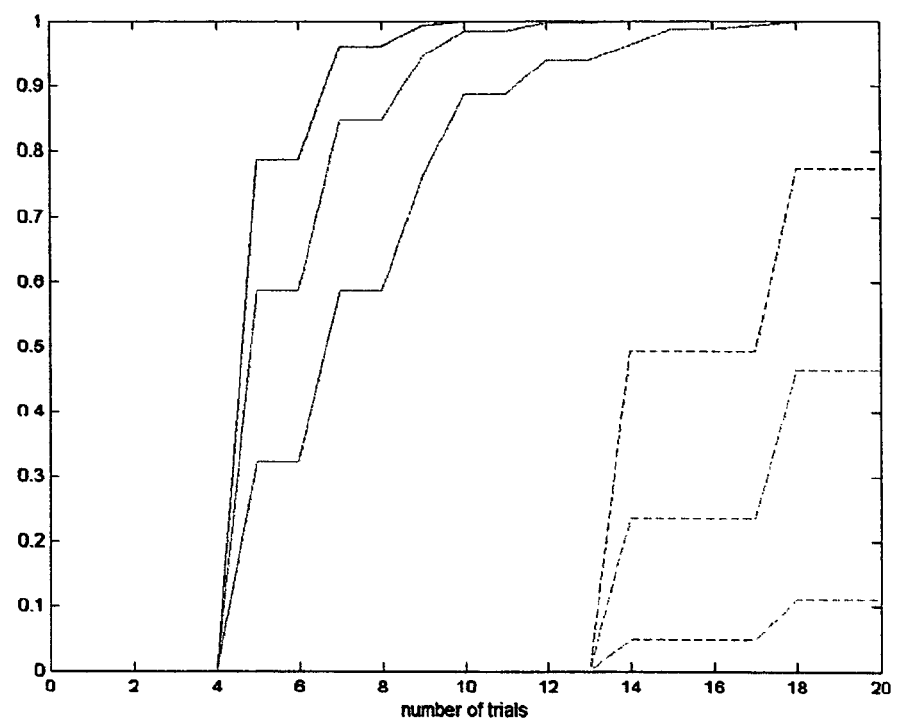

As described in greater detail below with regard to FIGS. 5A and 5B, the number of trials which are required to certify that a user who correctly recognizes the trained information (picture, pattern, pseudoword etc) a certain fraction of the time is not a random guesser was calculated. There are two other parameters to control—the number of "distractors" which are presented and the tolerable acceptance error. In FIG. 5A, the tolerable acceptance error is 0.01 or one chance in 100 that the entries were made by a guesser. In FIG. 5B, the tolerable acceptance error is 0.001 or one chance in 1000 that the entries were made by a guesser. The number of distractors considered is 1 for one set of lines and 6 for the other, that is, two patterns were shown in each presentation for the first set of data, and seven patterns were presented in each trial for the second set. Finally, because the user makes errors at random, the result is a distribution of success rates, so a cumulative distribution is shown. The vertical axis is the probability that a user with a particular accuracy is accepted in N or less trials.

Figure 4:
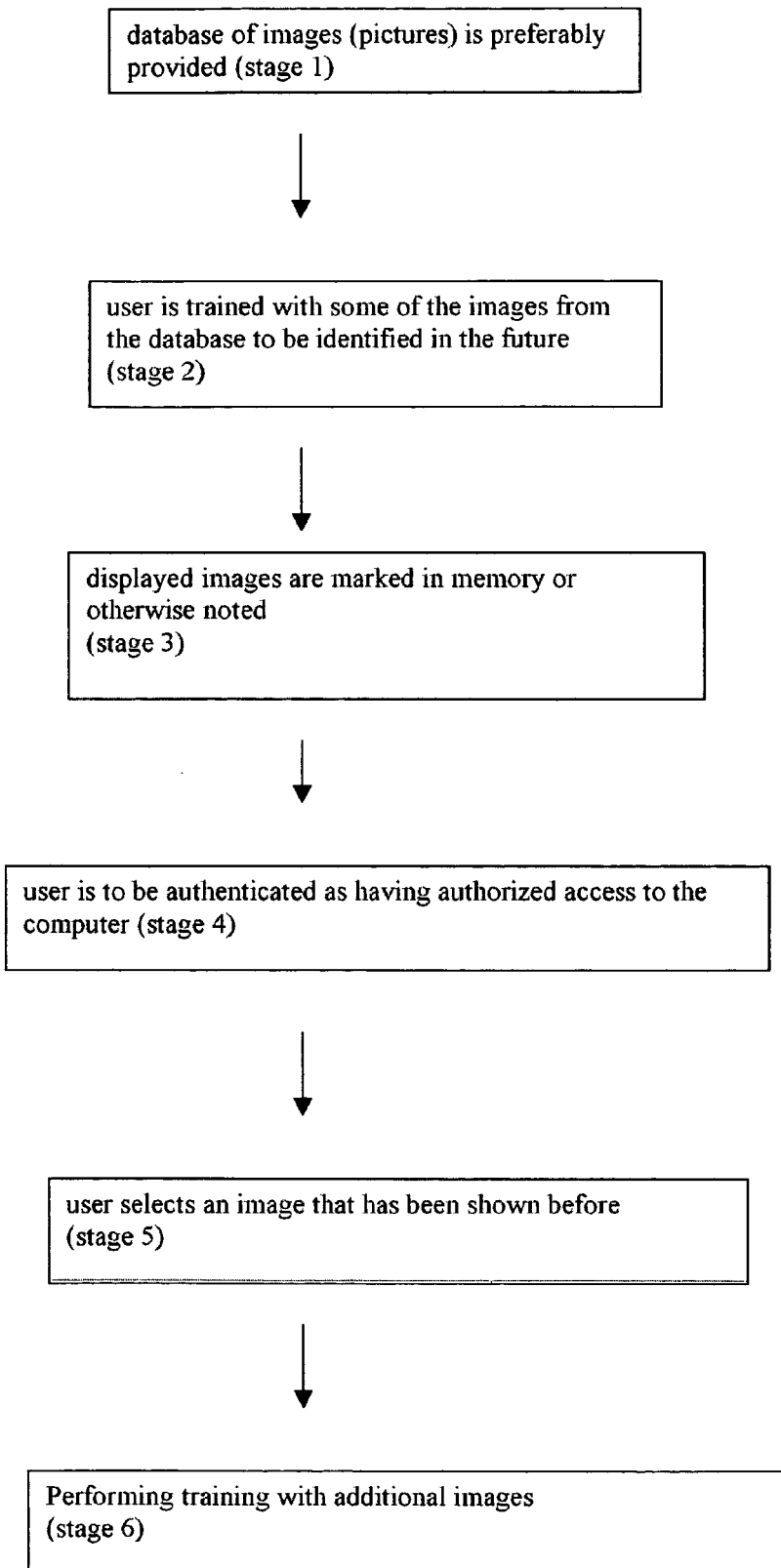
FIG. 4 shows a flowchart of an illustrative security implementation of the method according to the present invention.

FIG. 4 shows a flowchart of an exemplary security implementation of the method according to the present invention. As an example of the use of imprinted behavior as a certificate of identity, assume that a portable computer is to be protected from unauthorized use, for example to block an unauthorized individual from turning the computer on, logging in as the authentic (permitted) user, and accessing stored information therein. The application that controls security preferably uses the certification method according to the present invention.

As shown with regard to FIG. 4, in stage 1, a database of images (pictures) is preferably provided, more preferably at least about 100,000 such images. Optionally and preferably, the images are stored on the portable computer, for example on the hard disk of the computer. The pictures are preferably organized in groups, with a common theme, preferably also having a common focal point or narrative, such as two or more wild animals, two or more landscape scenes, two or more city scenes, etc.

In stage 2, the user is trained with the images from the database to be identified in the future. Optionally, the training program is operated by the portable computer itself, using the database of images; alternatively, the training may optionally be performed in some other way, outside of the operation of the portable computer. The training process preferably includes presenting a large number of pictures from the database, more preferably selected at random, for a short period of time, optionally 5 seconds or so apiece. Only one image of each group is preferably used for training.

In stage 3, the displayed images are marked in memory or otherwise noted, by the application as operated by the portable computer and/or by another external application.

In stage 4, the user is to be authenticated as having authorized access to the computer. Preferably, the user is shown groups of pictures from the groups that are stored together in the computer database, one of which has been shown to the user before.

In stage 5, the user selects an image that has been shown before, preferably one image of a group of images, only one of which was displayed during the training session. In a group of k images, the chance of an imposter (individual who is guessing) being correct is $1/k$. Even for $k=2$ after 6 trials the imposter's chances of being correct every time are less than 1 in 50, but for $k=7$, the imposter is expected to guess correctly in four successive trials less than one time in 2000. Thus, if the process is repeated, then the chance of guessing correctly is reduced significantly. Even if the user makes an error occasionally, say one time in 10 trials (the literature and the inventors' experiments suggest that a higher degree of accuracy can be maintained), 10 trials would be sufficient to reduce the probability that the performance could be produced by guessing to between 1 in 100 and 1 in 1000, as described herein, even if only a pair of images is used. The user may optionally set the desired level of security, such that the authentication program would test the user only until the user has performed the authentication process to the desired degree of certainty, according to the formula with which FIG. 5 (5A and 5B) has been calculated (see below). This saves time, and exposes the fewest pictures to possible "eavesdroppers".

The present invention also preferably includes a method to protect the authentication/authorization application from viewing the image(s) by looking over a user's shoulder or otherwise gaining unauthorized visual access to the image(s) during the authentication process. One option is use an image from the database only once. Alternatively, the user may be asked if the process occurred unobserved, such that the images could optionally be used again.

Optionally and more preferably, when insufficient images remain for the authentication process, the user is trained with more images from the database, and/or another database is provided, after which the training process is performed again, as shown with regard to stage 6.

A similar method may optionally be used when the database is on a server in a central, secure location, and the person desiring to be verified communicates with the system over a communications channel. The communication may be recorded, so images used for remote certification are preferably not reused at least for this purpose. Retraining to add extra images when the supply is low is preferably performed in a more secure location, such as on the user's personal computer for example.

FIGS. 5A and 5B both compare the behavior of three model users. In FIG. 5A, the cumulative distribution is shown of the number of trials required to reduce to 0.01 the chance that an imposter, guessing, could impersonate a valid user. In FIG. 5B, the chance of guessing (tolerable acceptance error) is reduced to 0.001. The dashed lines represent a protocol with two choices, the solid lines a choice between 7 alternatives. The three model users have, on average, 95% correct, 90% correct and 80% correct performances, such that they make errors at a constant rate of 5%, 10% or 20% of the trials, respectively. Two scenarios are considered: n=2 and n=7. The model stops presenting pictures for recognition when the chance that an imposter, guessing randomly, will do as well as the user has been reduced to 1 in 100. This is usually accomplished within three trials in the seven choice scenario. Only the least accurate user will ever require more than 6 trials to reach this level of certainty. If the threshold of certification is set at 0.001 (FIG. 5B), this protocol would require 5–7 trials under the same range of assumptions about user performance. Over this range of user performance, the 7-choice protocol requires 3–6 trials to certify identity at the 1% level, while the 2-choice protocol requires 7–11 or more.

FIGS. 5A and 5B show cumulative distributions. Each curve gives the probability that a user making errors at a specified rate will nonetheless reach the desired certification threshold at or before the number of trials indicated on the x-axis. Introducing more distractors makes it harder for the opponent to fool this system, since with one distractor, certification is not always obtained with high accuracy, while with 6 distractors, the model shows that high accuracy can be obtained always or at least with a very high frequency. If there are sufficient distractors (the group of lines on the left side of FIGS. 5A and 5B), the use of two more trials provides ten times more power in rejecting an imposter.

In a binary forced choice protocol (the dashed lines of FIGS. 5A and 5B) there is a greater premium on user accuracy. The user who makes 20% errors may require 20 or more trials before the system will certify this user at the 1% level, an unreasonable amount of effort. Although one might suspect that presenting more choices might cause users to make more errors, actual experimental results (not shown) found that the decrease in accuracy is slight or absent, so that increasing choices seems always to be a good design decision.

Figure 6:
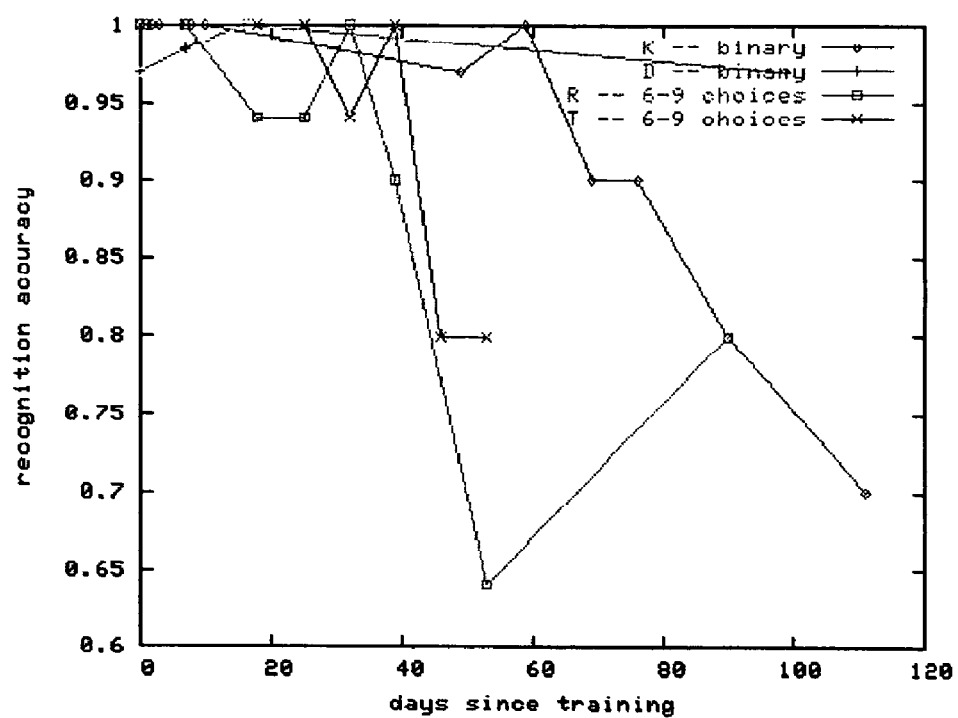
FIG. 6 shows a graph with results from actual users trained with the method according to the present invention.

As shown with regard to FIG. 6, actual experiments confirm that subjects, trained on 100–500 pictures in a training session lasting from a few minutes to half an hour, were often able to recognize previously seen pictures with better than 80% accuracy for at least a month and often much longer. The process was first studied with three subjects who were presented with a previously seen image and one not seen which were similar in most of their elements (e.g., two pictures of giraffes, one with two and the other with three giraffes). This proved more confusing than helpful to the subjects. Their performance, initially high, began to deteriorate to 70–80% after a month or two. When pictures were selected more randomly, by selecting pictures with a clear central subject or action, performance improved to that shown in FIG. 6. Using the same methodology for picture selection, we are now presenting subjects with 6–9 choices of picture. Preliminary results suggest that recognition percentages are as good as or better than were achieved with binary forced choice presentation.

FIG. 6 shows recognition accuracy achieved by three subjects, each trained on a fixed set of 100–500 pictures and then asked to select the previously-seen picture from a group of pictures at various later times. No trained picture was presented more than once in the testing. The two data files labeled "69pictures" are subjects shown pictures in groups of 6 to 9.

According to another optional embodiment of the present invention, rather than using every group of pictures (including one picture from the training session and the rest as distractors) only once, a variant method is optionally performed in which the pictures (optionally including both images on which the user was trained and also distractors) may optionally be used multiple times. Experiments with a number of human subjects have shown that it is possible to reuse these patterns, as they are more familiar when a subject sees them a second or third time (or more), while the distractors do not appear to also become familiar when reused (data not shown). These experimental results (data not shown) also indicate that recognition accuracy increases when groups of images (one trained picture plus related distractors) are reused, and that repeated exposure to the distractors does not confuse the user.

Therefore, reuse of the patterns is possible, but carries some exposure to eavesdropping. Preferably, the method includes safeguards against an eavesdropper being capable of understanding, guessing or otherwise obtaining the underlying pattern or other information concerning the encoding method.

EXAMPLE 2

Verbal Perception as the Sensory Mechanism

This Example relates to the recognition of pseudowords, in which recognition of the pseudowords forms the cryptographic primitive, and verbal perception and recognition is the example of the sensory mechanism. A recognition protocol can also optionally be designed with strings of letters, when it is not possible or not desirable to use pictures because of the additional memory and storage required, or because an adequate display facility is not available. Instead of pictures, this implementation of the present invention uses pseudowords, generated by taking a list of over a thousand common English words obtained from Wilson (10), and modifying them in one letter position using the program provided at (11). A native English speaker then selected pseudowords which are pronounceable, and do not exist as valid words. In this construction, the method followed a protocol similar to the one used in (12). Of course, the method could optionally be extended to form pseudowords in any language by a similar method.

Figure 7:
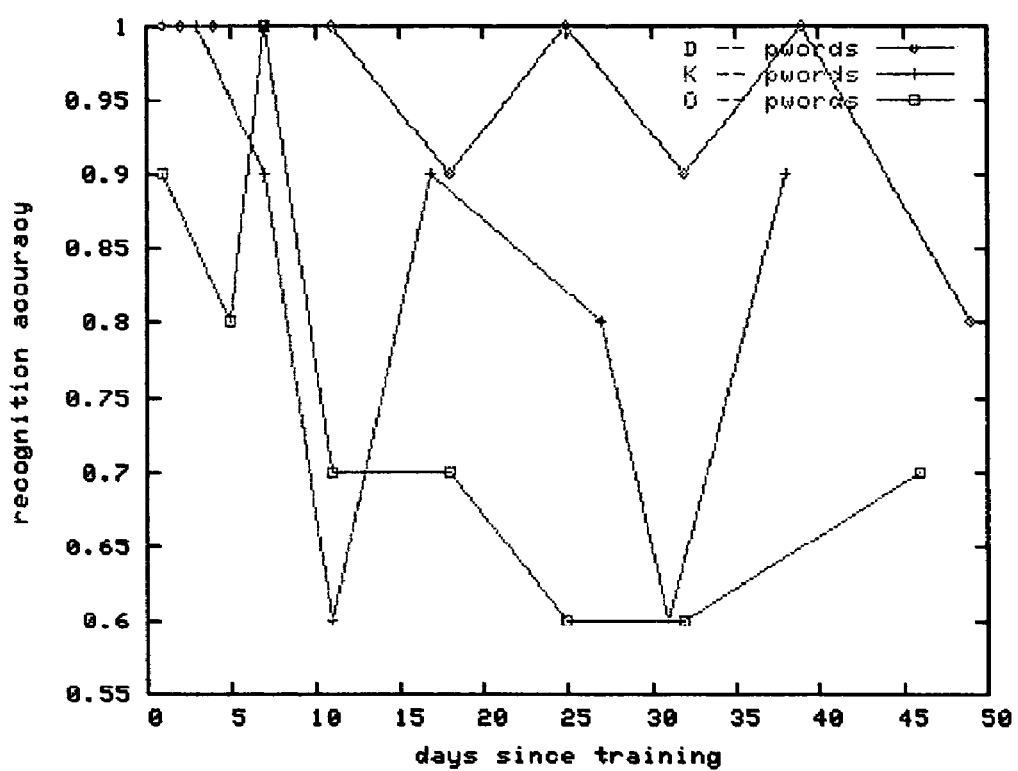
FIG. 7 shows a graph with results from actual users concerning recognition accuracy for the method according to the present invention as implemented with pseudowords.

As with pictures, during training subjects are familiarized with a random set of pseudowords. During verification subjects are presented with a plurality of pseudowords, preferably only one of which has been shown to them before, and are asked to identify the previously trained pseudoword. Pseudowords differ from pictures in that the native language of the user is expected to have an effect on the user's ability to recognize pseudowords based on one language. As an advantage, the pseudowords are expected to require less storage or transmission time than pictures. Recognition rates obtained with pseudowords in experiments, as shown with regard to FIG. 7, are comparable to but not quite as good as the accuracy seen in recognizing pictures. The results are shown for two subjects, with the pseudowords presented in groups, including one pseudoword shown during the training session and one not shown.

The picture recognition protocol has some advantages over the method of the present invention with pseudowords; for example, the picture recognition protocol is easier to use; it is more or less universal across cultures; and people demonstrate rather good long term retention of the pictures. Pseudowords are harder to train and somewhat less reliable, but they can be used when pictures are not an option. In order to maintain the safety of the protocol from eavesdroppers, re-training with a new set of pseudowords is preferably performed when all the training examples are used, as for the image recognition protocol.

EXAMPLE 3

Skill Acquistion as the Sensory Mechanism

This Example relates to certificates or training toward a cryptographic primitive that is based on skill acquisition, in which performance of the acquired skill represents the cryptographic primitive.

Figure 8:
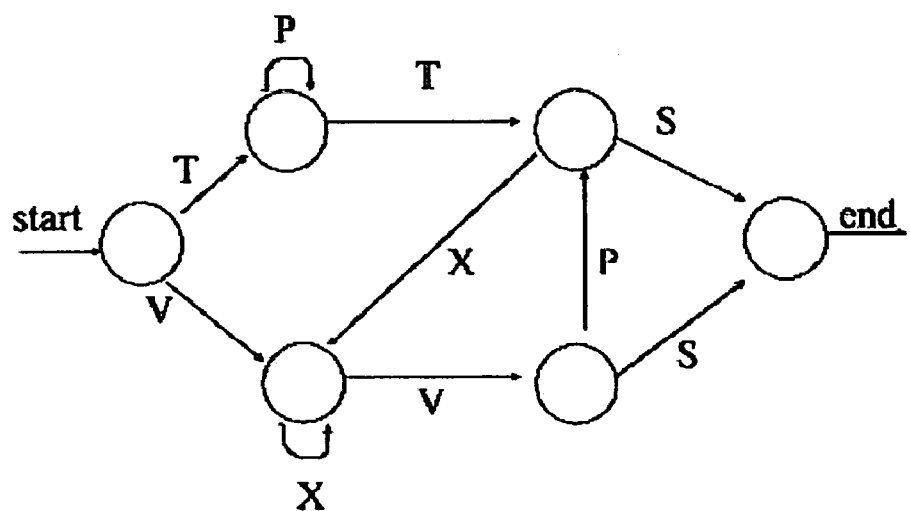
FIG. 8 shows a finite state machine (FSM) which generates a "grammar" of strings.

Skill acquisition may optionally be performed as based on the AGL (Artificial Grammar Learning) task first introduced to the literature of cognitive psychology by Reber (1967). In his experiments, subjects first learn sets of approximately 20 strings of three to eight characters. Although these letter strings might appear random, they have, in fact, been generated by a Finite State Machine (FSM) such as the one used by Reber, shown in FIG. 8. FIG. 8 shows a finite state machine (FSM) which generates a "grammar" of strings.

To produce a string with an FSM of FIG. 8, one begins at the "start" arrow at the left, and traces around the diagram in the direction of the arrows until one reaches "end" on the right. Each transition from one state (circle) to another generates a letter which is added to the end of the string generated thus far. One can either construct all possible strings and sample from that set at random, or associate probabilities with the possible directions one can take at each node of the FSM, and in that way associate a probability of being generated with each possible string. The first method was used in the initial experiments by the inventors, although both are potentially useful for the purposes of this invention.

For example, the strings possible with this particular FSM include:

| TTS | TPTS | TTXVS |
| VVS | VXVS | VVPS |

Reber's (1967) main finding was that his subjects could memorize "grammatical strings" which were systematically generated (by the FSMs) more readily than they could learn truly random strings. Still, the subjects were typically reported as unable to articulate the patterns they had learned. Even after being told explicitly that the strings they had learned were governed by "a complex set of rules" they were unable to give anything but the vaguest characterization of the strings' structure. Nonetheless, when given a forced-choice task with strings they had not previously seen, they were able to correctly distinguish strings that had been generated by the same FSM from random strings at a rate of nearly 80%.

The AGL task may therefore optionally be used as an "imprinted certificate" for the purpose of the present invention, in order to train subjects. Optionally and preferably, longer strings of 3–10 characters are used, and a larger FSM with 8–10 internal nodes to generate them. For each user requiring a certificate, an FSM is created at random.

The strings are preferably presented to the subject for identification, grouped or shown with at least one other string that is generated by an FSM which is similar in structure but has one or a plurality of letters in the wrong positions, optionally and more preferably at interior locations in the string. The experiments performed by the inventors showed a subject performance of better than 90% accuracy, even with this difficult choice, for short periods of time, and continued performance at better than 60% over several days was demonstrated. This degree of accuracy is sufficient to separate the real individual from an imposter, but requires more trials than the picture recognition test. However, because of the greater human error rate, the likelihood of an eavesdropping computer understanding how the strings are generated is enormously less likely. The convenience of the test can be increased by making the comparison string(s) (the wrong choice in each group) random or more nearly so, at some decrease in security.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent and patent application was specifically and individually indicated to be incorporated herein by reference. In addition, citation or identification of any reference in this application shall not be construed as an admission that such reference is available as prior art to the present invention.

REFERENCES

Reber, A. S. (1967). Implicit learning of artificial grammars. Journal of Verbal Learning and Verbal Behavior, 6, 855–863.

A. J. Parkin (2000). Essential cognitive psychology. Psychology Press LTD.

Perruchet, P. and Pacteau, C. (1990). Synthetic grammar learning: Implicit rule abstraction or explicit fragmentary knowledge? Journal of Experimental Psychology: General, 119, 264–275.

E. Tulving, D. L. Schacter, H. A. Stark (1982). Priming effects in word-gragment completion are independent of recognition memory. Journal of Experimental PSychology: Learning, Memory & Cognition, 8(4):336–342.

Cave, B. C. Very long-lasting priming in picture naming. Psychol. Sci. 8, 322–325 (1997).

G. Musen and A. Treisman (1990). Implicit and Explicit Memory for Visual Patterns. J Exp Psychol Learn Mem Cogn, 16(1):127–37.

Rensink, R. A., O'Regan, J. K., and Clark, J. (1997). To see or not to see: the need for attention to perceive changes in scenes. Psychological Science, 8(5), 368–373.

Long, G. and Olszweski, D. (1999). To reverse or not to reverse: When is an ambiguous figure not ambiguous? American Journal of Psychology, 112, 41–56.

R. N. Shepard (1967). Recognition memory for words, sentences, and pictures. J Verb Learn Verb Behav, 6:156–163.

L. Standing, J. Conezio, and R. N. Haber (1970). Perception and memory for pictures: single trial learning of 2500 visual stimuli. Psychon Sci, 19:73–74.

A. Karni and D. Sagi (1993). The time course of learning a visual skill. Nature, 365, 250–252.

R. Dhamija and A. Perrig (2000). Déjà vu: A user study using images for authentication. In *Proceedings of the 9th USENIX Security Symposium*, 2000.

N. J. Hopper and M. Blum (2000). A secure human-computer authentication scheme, preprint CMU-CS-00-139.

T. Matsumoto (1996). Human-computer cryptography: an attempt. In *ACM Conference on Computer and Communications Security*, pp. 68–75, 1996.

T. Matsumoto (1991). Human identification through insecure channel. In *Theory and Application of Cryptographic Techniques*, pp.409–421, 1991.

Microsoft. A press report is given at http://research.microsoft.com/displayArticle.aspx?id=417

Password. http://www.atstake.com/research/1c

What is claimed is:

1. A method for providing an electronic security function with a user, comprising:
    imprinting the user with at least one primitive determined from a sensory mechanism;
    determining a number of electronic presentation steps, thereby providing variable probability levels for customizable security; and
    at least one of automatically authorizing, identifying or authenticating the user according to an electronically detected ability of said user to discriminate between said at least one imprinted primitive and at least one non-imprinted primitive, said at least one imprinted primitive and said at least one non-imprinted primitive being presented to said user in said number of electronic presentation steps.

2. The method of claim 1, wherein said imprinting comprises implicit learning by the user.

3. The method of claim 2, wherein said at least one primitive is used to encrypt a message according to a one-way function.

4. The method of claim 2, wherein said at least one primitive is used only once.

5. The method of claim 2, wherein said at least one primitive is exposed using a near-zero knowledge protocol.

6. The method of claim 2, wherein said sensory mechanism comprises vision, such that said at least one primitive comprises an image.

7. The method of claim 6, wherein said recognizing said image comprises:
    training the user on a plurality of trained images; and
    testing the user on a combination of a trained image with at least one distractor image.

8. The method of claim 7, wherein said at least one distractor image comprises a plurality of distractor images.

9. The method of claim 7, wherein said testing comprises:
    selecting a plurality of different trained images by the user in sequence, said sequence providing said primitive for determining said at least one of authorizing, identifying or authenticating the user.

10. A method for automatically authenticating, authorizing or identifying a user, comprising:
    training the user with information through a sensory mechanism;
    determining a number of electronic presentation steps, thereby providing variable probability levels for customizable security; and
    electronically determining accurate discrimination by said user between at least one imprinted primitive and at least one non-imprinted primitive, to automatically authenticate, authorize or identify the user, said at least one imprinted primitive and said at least one non-imprinted primitive being presented to said user in said number of electronic presentation steps.

11. A method for use of an electronic one-way function for authenticating, authorizing or identifying a user, comprising:
    imprinting the user with a primitive;
    determining a number of electronic presentation steps, thereby providing variable probability levels for customizable security; and
    electronically testing said imprinting with at least a similar or identical primitive to automatically authenticate, authorize or identify the user, wherein said testing comprises electronically determining whether the user is capable of discriminating between at least one imprinted primitive and at least one non-imprinted primitive, said at least one imprinted primitive and at said least one non-imprinted primitive being presented to said user in said number of electronic presentation steps.

12. The method of claim 11, wherein said primitive is derived from input according to a sensory mechanism.

13. The method of claim 12, wherein said input comprises at least one image and said sensory mechanism is visual.

14. The method of claim 12, wherein said input comprises at least one pseudoword and said sensory mechanism is verbal.

15. The method of claim 12, wherein said sensory mechanism is selected from the group consisting of tactile, olfactory, audible and taste.

16. The method of claim 11, wherein said testing comprises determining whether the user is capable of discriminating between an imprinted primitive and a non-imprinted primitive.

* * * * *